United States Patent [19]
Bowlsbey

[11] Patent Number: 5,580,456
[45] Date of Patent: Dec. 3, 1996

[54] FILTER CAP AFFIXED TO A FILTER SLEEVE

[75] Inventor: John R. Bowlsbey, Elkton, Md.

[73] Assignee: W. L. Gore & Associates, Inc., Newark, Del.

[21] Appl. No.: 457,525

[22] Filed: Jun. 1, 1995

Related U.S. Application Data

[62] Division of Ser. No. 168,627, Dec. 16, 1993, Pat. No. 5,456,834.

[51] Int. Cl.$^6$ .................................................... B01D 27/06
[52] U.S. Cl. ...................... 210/493.2; 210/435; 210/446; 210/497.1; 156/69
[58] Field of Search .......................... 210/493.1, 493.2, 210/496, 497.1, 440, 435; 156/69, 73.1, 218, 283, 294, 295, 580.2

[56] References Cited

U.S. PATENT DOCUMENTS

| | | | |
|---|---|---|---|
| 3,675,777 | 7/1972 | Heskett et al. | 210/232 |
| 3,953,566 | 4/1976 | Gore . | |
| 4,411,720 | 10/1983 | Sager | 156/69 |
| 4,608,166 | 8/1986 | Cain | 210/232 |
| 5,114,508 | 5/1992 | Miyagi et al. | 156/69 |
| 5,228,990 | 7/1993 | Chiang | 210/223 |
| 5,358,638 | 10/1994 | Gershenson | 210/448 |

FOREIGN PATENT DOCUMENTS

| | | |
|---|---|---|
| 0452592A1 | 10/1991 | European Pat. Off. . |
| 927578 | 5/1947 | France . |
| 1905818 | 2/1969 | Germany . |
| 58-81532 | 5/1983 | Japan . |

OTHER PUBLICATIONS

Gore-Tex(TM) Membrane Liquid Filtration Technologies, May, 1991, W. L. Gore & Assoc. Inc, 4 pages.
Industrial Filter & Pump Mfg. Co., Bulletin 114G. Type 114G, Hydra-Shoc(R) Tube Filter, Date-unknown.
U.S. Filter Auto-Shok(TM), "Bump & Run" Tubular Backpolse Filter, U.S. Filter Fluid Systems Corporation, Date--unknown.
Back-Pulse Liquid Filtration Enhances Tubular Filter Role, Chemical Processing, Jan. 91, 4 pages.

*Primary Examiner*—David A. Reifsnyder
*Attorney, Agent, or Firm*—David J. Johns; Carol A. Lewis White

[57] ABSTRACT

Improved apparatus and method for installing a filter sleeve in filtration apparatus is provided. In its basic form, the present invention uses a filter sleeve with a pre-installed end cap bonded to at least one of its ends. Through use of a bonding process such as sonic welding, the end cap and filter sleeve form a tight seal with one another which is durable and quite resistant to leakage. The end cap can be provided with receptacles to allow for ready interface with existing filtration apparatus, eliminating presently utilized mounting procedures which can be ineffective, burdensome, and time consuming. Additionally, improved method is also provided for securely sealing the opposite end of the filter sleeve.

7 Claims, 3 Drawing Sheets

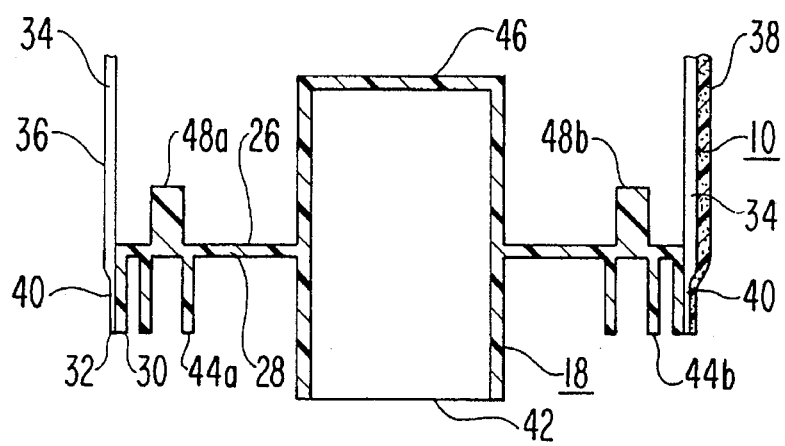
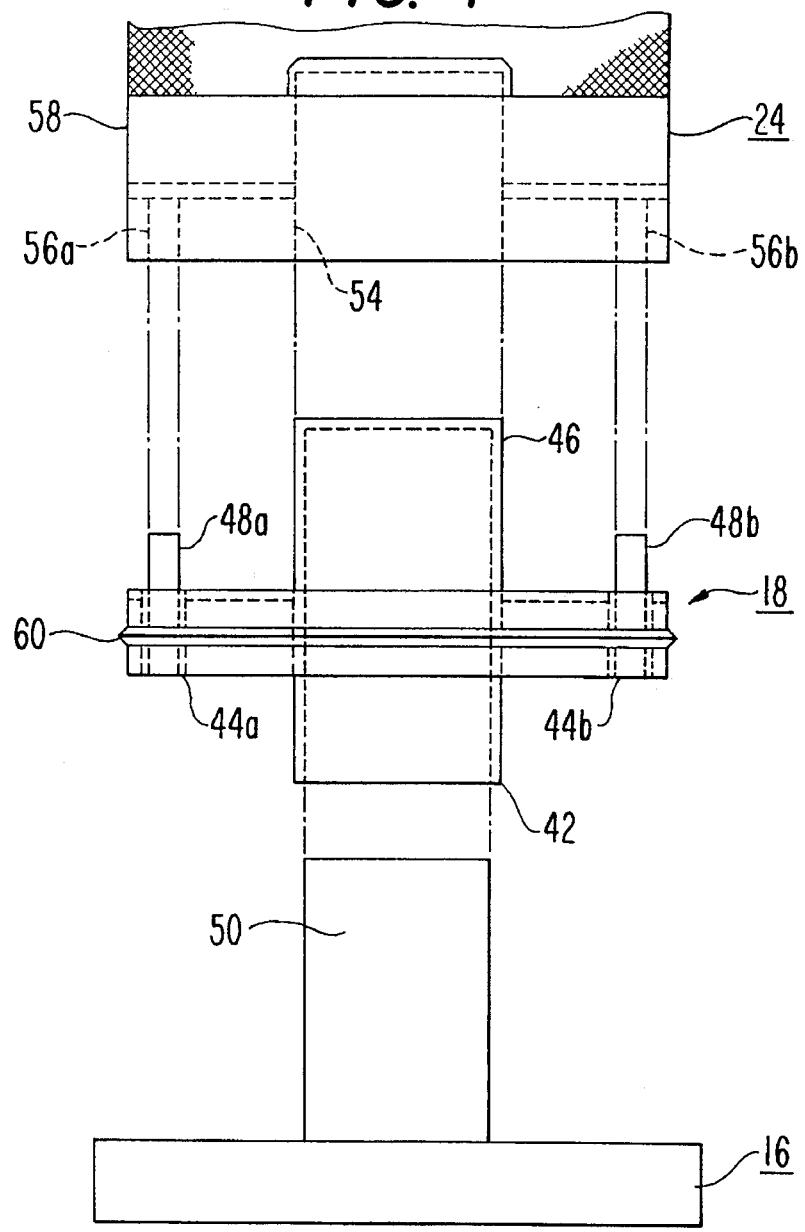

FILTER CAP AFFIXED TO A FILTER SLEEVE

RELATED APPLICATIONS

The present application is a division of U.S. patent application Ser. No. 08/168,627 filed Dec. 16, 1993, now U.S. Pat. No. 5,456,834

BACKGROUND OF THE INVENTION

1. Field of the Invention

The present invention relates to industrial filter apparatus, and especially to tubular or "candle" filter devices.

2. Description of Related Art

It is common today to employ tubular filters in a variety of industrial filtering applications. These filters generally comprise a cylindrical sleeve of filtration media open at both ends which is slid over an inner perforated tube.

When a pressure differential is established across the filter, fluid flows through the filtration media and filtrate is removed. In order to prevent by-passing of unfiltered fluid around the sleeve, it is important that the ends of the sleeve are tightly sealed to the ends of the tube to avoid leakage of solids through the ends of the sleeve.

Most applications employing tubular filters use a number of tubes mounted in parallel with each other in a tube bundle. The tube elements are joined at one end to a fluid conduit in the form of a tube sheet or manifold and may be attached at their opposite ends to a spacer grid to maintain their relative positions. For liquid fluid filtration, the entire tube bundle is then mounted in the filter, or merely submerged in the liquid to be filtered, to remove unwanted impurities.

Although these forms of filtration apparatus are quite effective, maintenance of the filtration media has proven problematic. It is often a burdensome procedure to seal each end of the filter sleeve individually to each tube. These seals are usually formed with a cord, waterproof adhesive tape, or one of a variety of removable clamping elements. Unfortunately, sealing in this manner is time consuming, burdensome, and sometimes ineffective at sealing certain types of filtration media.

One of the major improvements in filter media has been the development of expanded polytetrafluoroethylene (PTFE). Such a membrane product can be produced in a known manner, such as in accordance with the teachings of U.S. Pat. No. 3,953,566 issued Apr. 27, 1976, to Gore. This material forms a microporous structure which can be adapted to provide specific filtration properties in many different forms. Sleeves for tubular filters are commercially available from W. L. Gore & Associates, Inc., Elkton, Md., under the trademark GORE-TEX® Membrane Tubular Filter Sleeves. These products comprise an expanded PTFE membrane attached to a felt-like material ranging in thickness from 0.75 to 2.5 mm. For certain applications, this material may comprise a composite, with additional layers applied to the filtration media for improved durability or better filtration.

While the use of expanded PTFE membrane laminates as a filter media provides exceptional filtration properties and durability, they too are difficult to seal at each end. As is true with other membrane composite filtration media, if fluid tight seals are not created between the membrane filter media and the ends of the tubes, particles can seep under the surface of the membrane through the fabric membrane support material and into the filtrate. This seepage of particulate up the end of the sleeve can result in serious filter compromise. As a result, particular care must be exercised in covering and sealing the ends of such media to assure a leakage-free system.

Maintaining the integrity of the filtration media/tube interface is further complicated in filtration apparatus employing back pulsing or similar procedures to clean solids or filter cakes intermittently from the filtration media. The reverse flow of filtrate inherent in such procedures increases the likelihood of leakage under the membrane through the support fabric at its ends.

Accordingly, it is a primary purpose of the present invention to provide a filter sleeve which is pre-mounted on an end cap so as to allow for easy installation.

It is another purpose of the present invention to provide a pre-installed fluid-tight seal between the ends of a filter sleeve and a tube to resist leakage around the membrane and up the end of the filtration media.

It is a further purpose of the present invention to provide a pre-installed end cap on a filter sleeve which can readily interface with existing filtration apparatus.

It is still another purpose of the present invention to provide methods for producing and installing a filter sleeve of a filter tube which is both effectively sealed and readily installed.

These and other purposes of the present invention will become evident from review of the following specification.

SUMMARY OF THE INVENTION

The present invention comprises improved apparatus and method for mounting a filter sleeve in filtration apparatus. The filter sleeve of the present invention employs an end cap bonded (e.g., through sonic welding) to an end of the filter sleeve. The bonding of the end cap in place serves to prevent longitudinal leakage of non-filtered fluid under the membrane through the interstices of support material. An exemplary bond densifies the sleeve into tight contact with the end cap, preventing fluid flow through the junction. By using a pre-installed end cap, installation and maintenance is quicker and easier than with existing filter sleeve sealing methods.

Preferably, the end cap of the present invention includes receptacles therein to permit ready interface with conventional filtration apparatus. Ideally, the end cap contains complementary openings and projections to allow for instant attachment to conventional internal tube elements and mounting elements on the filtration apparatus. The present invention can be modified for use with a variety of filtration apparatus simply by producing different end cap configurations.

The apparatus and method of the present invention provide a significant improvement in the installation and maintenance of filter sleeves. To improve filtration operation and maintenance further, the present invention also contemplates use of improved sealing methods for the opposite end of the filter sleeve, which again reduces installation and maintenance time and improves sealing of the filter sleeve to the tube to prevent leakage.

DESCRIPTION OF THE DRAWINGS

The operation of the present invention should become apparent from the following description when considered in conjunction with the accompanying drawings, in which:

FIG. 3 is a cross-section view along line 3—3 of FIG. 2;

FIG. 4 is an elevational view of an end cap of the present invention shown in exploded orientation with a conventional tube and a conventional grid;

DETAILED DESCRIPTION OF THE INVENTION

The present invention is an improved apparatus and method for mounting a tubular filter sleeve on conventional filtration apparatus. As used herein, the term "filter sleeve" is intended to include any form of tubular or similarly formed filtration media, such as a tube filter slid over a perforated tube element in a liquid filtration apparatus.

Figure 1:
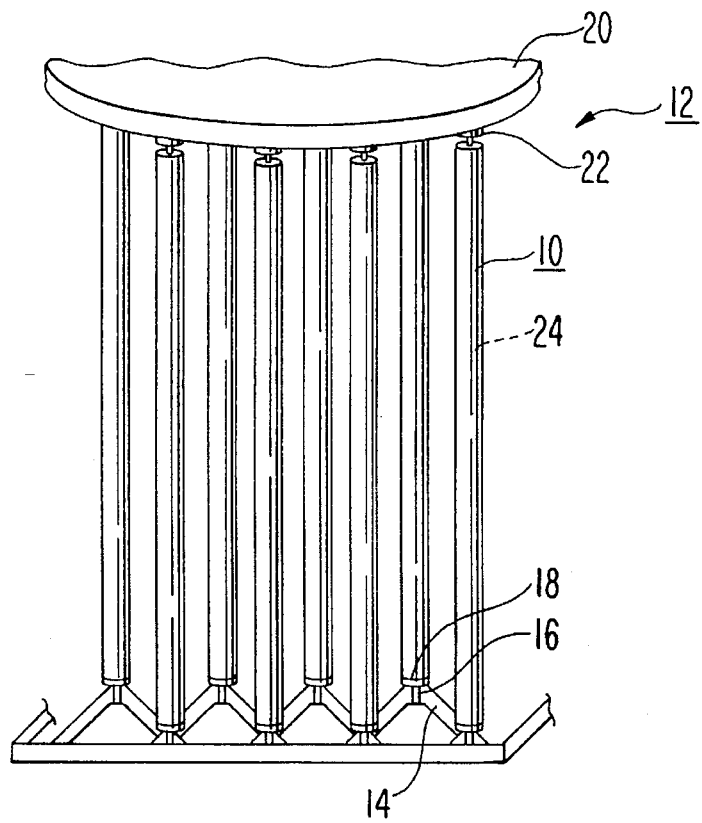
FIG. 1 is an isometric view of a conventional tubular filter apparatus with a series of filter sleeves of the present invention installed therein.

FIG. 1 shows a series of filter sleeves 10 of the present invention mounted in a rack of a conventional filtration apparatus 12. The lower portion of the filtration apparatus 12 comprises a bottom separation grid 14 having a series of mounting elements 16 into which end caps 18 of the filters sleeves 10 attach. The upper portion of the filtration apparatus 12 comprises an upper tube sheet or manifold 20 having a series of fittings 22, each forming a fluid connection between a perforated tube 24 mounted within the filter sleeves 10 and fluid conduits (not shown).

Filtration apparatus 12 of the type shown in FIG. 1 is commonly employed within industrial filters, such as those used for filtering fresh and salt water, waste liquids, liquid food products (e.g. sugar solutions or oils) or intermediates, and various chemical products or intermediates. It should be understood that the present invention is not limited to interface with the illustrated apparatus and may be adapted for use in many other filter sleeve uses.

Figure 2:
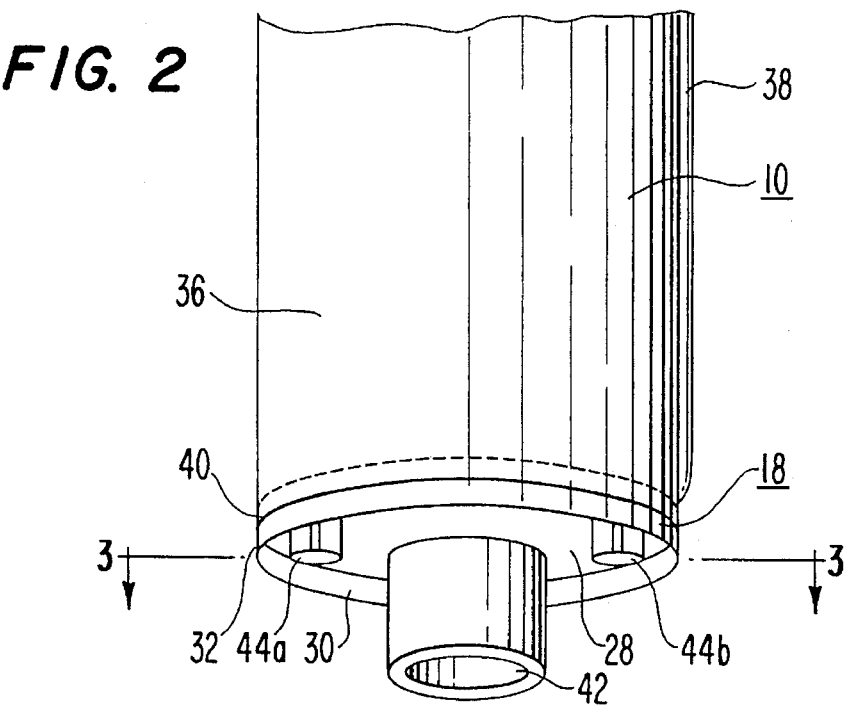
FIG. 2 is a three-quarter perspective view of filter sleeve with an end cap of the present invention.

FIGS. 2 and 3 show one embodiment of an end cap 18 of the present invention. The cap 18 has a first side 26, mounted facing within the filter sleeve 10, an opposite second side 28, mounted facing away from the filter sleeve 10, and a circumferential ring 30. The ring 30 is adapted to fit within a first end 32 of the filter sleeve 10 and be bonded to it.

The end cap may be constructed from any suitable material appropriate for use with a given application. For most usages, the end cap may be constructed from any one of the following: polypropylene, polyester, polystyrene, polyvinylchloride (PVC), polyvinylidene fluoride (PVDF), fluorinated ethylenepropylene (FEP), acrylonitrile butadiene styrene (ABS), or any compatible thermoplastic.

For many filtration applications the preferred filtration media comprises a composite of felt 34 (e.g., polytetrafluoroethylene (PTFE), expanded PTFE, propylene, or similar support felt or other fabric material) laminated to a microporous membrane 36 (e.g., expanded PTFE film). Suitable material of this type is commercially available from W. L. Gore & Associates, Inc., Elkton, Md., under the trademark GORE-TEX Membrane Tubular Filter Sleeves. This material may be produced in the form of a continuous tube or may be wrapped into a cylinder and sealed into that position along seam 38.

While the above described filter media is a very effective filter, until the present invention it has proven burdensome to seal properly at the ends. The microporous membrane 36 is sensitive to damage through common sealing techniques. For instance, the membrane cannot be sewn through without exposing the interstices of the felt to leakage. Additionally, if a snug fit is not created between the filter sleeve and the end cap, any wrinkling of the filtration media can likewise lead to membrane damage; this is a particular concern with the use of clamps which can damage the membrane and conceal such damage from easy inspection. Finally, as has been explained, conventional taping procedures are time consuming and can lead to leakage if not correctly performed.

For these applications it is preferred to bond the ring 30 to the filter sleeve 10 through a process that does not damage the filtration media. The bonding process should resist passage of fluid both between the cap 18 and the filter sleeve 10, and longitudinally through the filtration media itself in the area of the cap 18. This bonding process may comprise a variety of adhesives (e.g. epoxy, glues, etc.) melting or other welding procedures, impulse heat sealing ("hot wire"), hot probes, hot gas, adhesive tapes, etc.

It has been determined that a very effective seal can be formed between a filter media of expanded PTFE and an end cap 18 of polypropylene or similar thermoplastic material through a sonic weld. This procedure is performed by using a sonic weld apparatus, such as a Series 900 Sonic Welder available from Branson Ultrasonics Corporation, Danbury, Conn. A semi-circular "horn" is used to match the contour of the end cap 18 and a weld is established by placing the horn in tight contact with the sleeve and cap and applying sonic energy. Typical conditions required to produce a suitable densification and seal between a sleeve of laminated felt/expanded PTFE membrane filtration media and a polypropylene cap comprise applying about 1000 watts of energy and about 20 to 40 kg of force for approximately 600 milliseconds.

The sonic weld produces a particularly effective bond for use in the present invention. First, the sonic weld creates a tight seal between the cap 18 and the filter sleeve 10. Second, as is shown in FIGS. 2 and 3, the sonic welding process forms a densified seam 40 around the periphery of the filter sleeve. The densified seam 40 prevents fluid from seeping through the interstices of the filtration media and the risk to filter compromise inherent with such seepage.

Other forms of bonds which may be employed with the present invention include ones created through fusion welding, such as through the use of electromagnetic field fusion welding (e.g. the EMAWELD Process available from Emabond Systems, Specialty Polymers & Adhesives, Ashland Chemicals, Inc., Norwood, N.J. (melting plastic and metal particles)), hot wire welding processes, "hot jaws" processes, hot air, etc.

The preferred end cap 18 includes a series of receptacles therein to permit ready interface with filtration apparatus. For use with many conventional filtration systems, the embodiment of FIGS. 2 and 3 includes a center socket 42 and multiple "spanner holes" or apertures 44a, 44b on its outside surface 28, and a center hub 46 and multiple "pins" or projections 48a, 48b on its inside surface 26. This construction is particularly suitable for use with available filtration apparatus such as a Type 114G HYDRA-SHOC® Tube Filter manufactured by Industrial Filter & Pump Mfg. Co., Cicero, Ill.

The interface between the end cap 18 and the filtration apparatus is shown in FIG. 4. A conventional spacer grid includes mounting elements 16 into which perforated tube 24 attach. As such, the mounting element 16 includes a hub 50 adapted to connect into the tube element 24 via corresponding socket 54 or through use of an intermediate tube element (not shown). Spanner holes 56a, 56b are provided in a conventional end cap to assist in screwing the tube 58 into a manifold at its opposite end. In a normal installation, the filter sleeve is adhered or clamped directly to a base 58 of the tube element 24.

The end cap 18 of the present invention is designed to fit between the mounting element 16 and the tube element 24 and join to each of them. As is shown in FIG. 4, when the tube element 24 is slid within the filter sleeve, center hub 46 fits within socket 54 and projections 48a and 48b fit within spanner holes 56a and 56b. In this manner, the tube element 24 and the filter sleeve instantly form a single unit with one another, without the time consuming and burdensome procedure of taping or clamping the two together.

Once the complete filter unit is formed in this way, it can be positioned and used at least as easily as a conventional tubular filter sleeve. Apertures 44a and 44b in the end cap 18, corresponding to spanner holes 56a and 56b, allow the tube 24 to be threaded into a manifold at its opposite end in a conventional manner. Additionally, the filter unit readily attaches to the mounting element 16, with hub 50 inserted within center socket 42, without the need for any intermediate connection.

It has been found that when the cap 18 is attached to a filter sleeve through a sonic welding procedure, it is beneficial to include a ridge 60 of material around ring 30 to serve as an energy director. This ridge provides a tighter contact between the cap 18 and the filter sleeve during the welding process and also supplies more material in the critical area of bonding between the end cap and the filter sleeve. Other possible ridge shapes include: a series of nubs, multiple ridges, etc.

It should be evident from the above description that the present invention can be adapted for use with a variety of different filtration apparatus merely by supplying suitable end caps complementing various perforated tube mounting configurations. Examples of other common mounting configurations which may be used with the present invention include rectangular, hexagonal, oval, or other geometric shaped hubs and sockets, etc.

Through use of the sealed end cap of the present invention, a number of important functions are performed. First, the filter sleeve can be mounted on the filtration apparatus far faster than with existing mounting methods. Second, periodic maintenance is also easier and much faster, with filter sleeve removal time drastically reduced, less contact required between operators and filtered and unfiltered solution (e.g., clamps, tape, or other existing mounting devices often must be struggled with, increasing the amount of operator exposure to slurry, solids, and filtrate), and vastly easier inspection of the tube elements for leakage (i.e., due to the absence of clamps, tape, etc., it is easy to see any areas at the end of the filter sleeve where discoloration appears and leakage may be occurring). Third, the tight seal produced with the present invention provides both superior leak-resistance and greater durability.

As has been mentioned, the opposite end of the filter sleeve must likewise be sealed to the filtration apparatus. Even though conventional sealing techniques such as clamps or cords for attaching this end are generally acceptable for most filter media, it is believed that faster and more reliable seals may be used in conjunction with the present invention. This may be particularly important with the use of a laminated felt/expanded PTFE composite sleeve filter. One such technique is illustrated in FIGS. 5a through 5d.

Figure 5A:
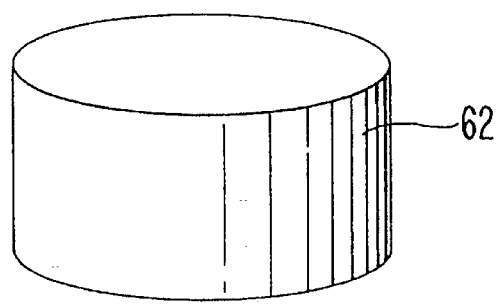
FIGS. 5a is an elastic band for use one embodiment for sealing an end of a filter sleeve in the present invention.
Figure 5B:
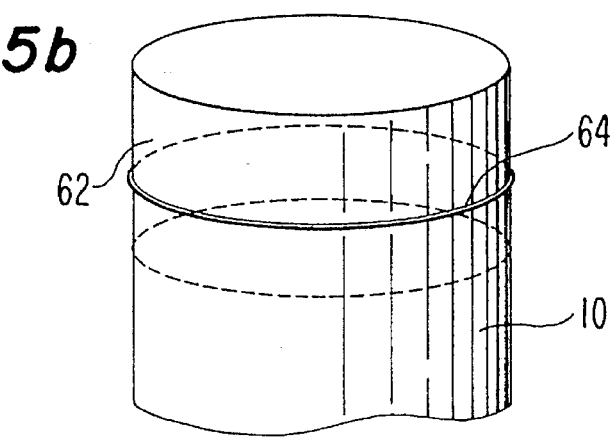
FIG. 5b is an elastic band shown inserted in the end of a filter sleeve.
Figure 5C:
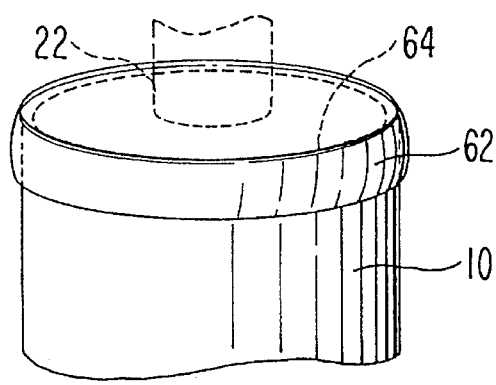
FIG. 5c is an elastic band shown wrapped around the end of a filter sleeve.
Figure 5D:
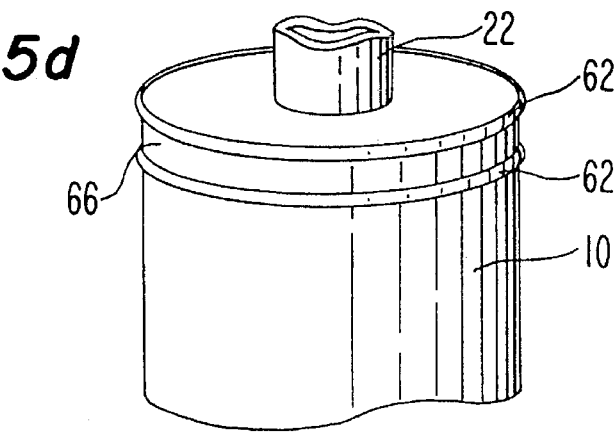
FIG. 5d is an elastic band shown clamped into position around the end of a filter sleeve attached to the top of a tubular support element.

The effective sealing of the second end uses an elastic band 62. The band 62 is proportioned to fit precisely around a fitting 22 and within an end 64 of a filter sleeve 10 (i.e., positioned between filter sleeve 10 and the fitting 22). The band 62 should be flexible enough to be doubled over the end 64 and enwrap the outside of the filter sleeve 10, as is shown in FIGS. 5b and 5c. In this manner, fitting 22 is snugly installed within the enwrapped end 64 of the filter sleeve 10 and retained in place therein with a strap 66, such as a clamp, cord, wire, band, or other retention means. The advantage of this mounting method is that the filtration media is isolated from the clamping element, avoiding damage that flexing and friction generated between the filtration media and the clamp can cause. Additionally, the terminus of the end 64 is completely sealed from exposure to slurry, thus assuring that leakage does not occur longitudinally along the interstices of the filter sleeve 10.

This sealing method is quite effective and should be useful for all kinds of applicable filtration environments. It should be noted that for some applications this sealing technique may also be effective on the lower end or both ends of the tube filter. For all applications, the type of elastic band 62 and retention means 66 chosen to secure the band 62 are application specific. For most applications, the following materials are may be appropriate, for the elastic band 62: natural rubber, ethylenepropylene diene monomer (EPDM), CALREZ, silicone, neoprene, Bunan, urethane, etc.; for the strap 66: metal (e.g., stainless steel, alloy), nylon, polypropylene, etc.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A cap for sealing an end of a filter sleeve that consists essentially of:

a cap comprising an interior surface, an exterior surface and an outer circumferential ring connecting said interior and said exterior surfaces, the cap being adapted to fit said outer circumferential ring within an end of a filter sleeve with said interior surface facing into the sleeve;

a center hub and at least one projection on said interior surface to permit the cap to interface with a base of an interior perforated tube.

2. The cap of claim 1, wherein said outer circumferential ring includes at least one ridge around at least a portion thereof to aid in sealing the cap to the filter sleeve.

3. The cap of claim 1, wherein said cap comprises at least one material selected from the group consisting of polypropylene, polyester, polystyrene, polyvinylchloride, polyvinylidene fluoride, fluorinated ethylenepropylene and acrylonitrile butadiene styrene.

4. The cap of claim 1, wherein said outer circumferential ring includes a series of nubs around at least a portion thereof to aid in sealing the cap to the filter sleeve.

5. The cap of claim 1, wherein said outer circumferential ring has a cross-sectional geometry selected from the group consisting of circular, rectangular, hexagonal and oval.

6. A cap for seating an end of a filter sleeve that comprises:

a cap comprising an interior surface, an exterior surface and an outer circumferential ring connecting said interior and said exterior surfaces, the cap being adapted to fit said outer circumferential ring within an end of a filter sleeve with said interior surface facing into the sleeve;

a center hub and at least one projection on said interior surface to permit the cap to interface with a base of an interior perforated tube, wherein the cap is bonded to the filter sleeve by densification of the filter sleeve around at least a portion of the outer circumferential ring so as to resist seepage of unfiltered liquid longitudinally through the filter sleeve past the cap.

7. The cap of claim 6, wherein said bond comprises a bond selected from the group consisting of a sonic weld, a fusion weld, a hot wire weld, a hot jaw weld and a hot air weld.

* * * * *